United States Patent
Gerth et al.

(10) Patent No.: US 10,762,268 B2
(45) Date of Patent: Sep. 1, 2020

(54) APPARATUS AND METHOD FOR TESTING A CIRCUIT

(71) Applicant: Fraunhofer-Gesellschaft zur Foerderung der angewandten Forschung e.V., Munich (DE)

(72) Inventors: Stephan Gerth, Bischofswerda OT Weickersdorf (DE); Karsten Einwich, Dresden (DE); Thomas Markwirth, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/157,835

(22) Filed: Oct. 11, 2018

(65) Prior Publication Data

US 2019/0042682 A1 Feb. 7, 2019

Related U.S. Application Data

(63) Continuation of application No. PCT/EP2017/058991, filed on Apr. 13, 2017.

(30) Foreign Application Priority Data

Apr. 15, 2016 (EP) .................................... 16165674
Aug. 5, 2016 (EP) .................................... 16183057

(51) Int. Cl.
*G06F 30/30* (2020.01)
*G06F 30/33* (2020.01)
(Continued)

(52) U.S. Cl.
CPC ... *G06F 30/367* (2020.01); *G01R 31/318357* (2013.01); *G06F 30/30* (2020.01);
(Continued)

(58) Field of Classification Search
USPC ......................................................... 716/136
See application file for complete search history.

(56) References Cited

U.S. PATENT DOCUMENTS 6,651,038 B1 11/2003 Johns et al.
8,244,512 B1 8/2012 Tseng et al.
(Continued)

OTHER PUBLICATIONS

"SystemC Domains", IEEE Standard for Standard SystemC(R) Analog/Mixed-Signal Extensions., Jan. 2016.
(Continued)

*Primary Examiner* — Bryce M Aisaka
(74) *Attorney, Agent, or Firm* — Perkins Coie LLP; Michael A. Glenn

(57) ABSTRACT

The invention refers to an apparatus for testing a circuit, including: an interrupter configured for interrupting based on a circuit model describing at least a part of the circuit a connection between two components of the circuit, wherein the circuit model describes the two components connected by the connection, an inserter configured for inserting based on the circuit model a test element model into the interrupted connection, and an evaluator configured for evaluating based on the circuit model and the test element model a response of the circuit model to the inserted test element model. The invention also refers to a corresponding method.

12 Claims, 3 Drawing Sheets

(51) Int. Cl.
*G06F 30/367* (2020.01)
*G01R 31/3183* (2006.01)
*G06F 30/327* (2020.01)
*G06F 111/20* (2020.01)

(52) U.S. Cl.
CPC ............ *G06F 30/327* (2020.01); *G06F 30/33* (2020.01); *G06F 2111/20* (2020.01)

(56) References Cited

U.S. PATENT DOCUMENTS

| | | |
|---|---|---|
| 2006/0217948 A1 | 9/2006 | Humphrey et al. |
| 2007/0090975 A1* | 4/2007 | Watanabe ........... G06F 17/5022 341/51 |
| 2009/0018802 A1 | 1/2009 | De Kleer |
| 2012/0004896 A1 | 1/2012 | Li et al. |

OTHER PUBLICATIONS

Barnasconi, Martin et al., "Advancing system-level verification using UVM in SystemC", Design and Verification Conference & Exhibition (DVCon), Mar. 2014, 1-18.

Czerny, Barbara et al., "ISO 26262 Functional Safety Draft International Standard for Road Vehicles: Background, Status, and Overview", ISSC 2010 Minneapolis, Minnesota.

Ehrlich, Paul et al., "UVM-SystemC based hardware in the loop simulations for accelerated Co-Verification", Design and Verification Conference & Exhibition (DVCon Europe), Oct. 2015, 1-16.

Markwirth, Thomas , "Entwicklung einer SystemC Modellbibliothek zur Transaktions-Level-Modellierung (TLM) für den Konzeptionsentwurf von Systemen der Automobilelektronik", Diplomarbeit TU-Dresden; 2011, 1-74.

Markvvirth, Thomas et al., "Statistical Modeling with SystemC-AMS for Automotive Systems", Fraunhofer Institute for Integrated Circuits, Design Automation Devision Zeunerstr. 38, 01069 Dresden, Germany, 1-2.

"Accellera Systems Initiative, Standard Universal Verification Methodology (UVM)", http://www.accellera.org/downloads/standards/uvm/.

"IEEE Standard SystemC® Language Reference Manual", IEEE Std 1666™-2005, 1-441.

"Standard SystemC® AMS extensions 2.0 Language Reference Manual", http://www.accellera.org/downloads/standards/systemc.—relevant parts: 2.1.4 and 4.

Schulz, Stephan et al., "Transmitting TLM transactions over analogue wire models", 978-3-9810801-6-2/DATE10© 2010 EDAA.

* cited by examiner

APPARATUS AND METHOD FOR TESTING A CIRCUIT

CROSS-REFERENCES TO RELATED APPLICATIONS

This application is a continuation of copending International Application No. PCT/EP2017/058991, filed Apr. 13, 2017, which is incorporated herein by reference in its entirety, and additionally claims priority from European Applications Nos. EP 16 165 674.9, filed Apr. 15, 2016, and EP 16 183 057.5, filed Aug. 5, 2016 all of which are incorporated herein by reference in their entirety.

The invention refers to an apparatus for testing a circuit and to a corresponding method for testing a circuit.

BACKGROUND OF THE INVENTION

There is an increasing complexity of systems or circuits consisting of analogue and digital hardware and embedded software. The physical environment has to be taken into consideration during the verification and validation phase of the systems. However, verification is not only involved for the nominal behavior. The behavior also has to be checked in case of faulty components. This ensures that not only the fulfilment of functional requirements is inspected but also the fulfilment of safety requirements. Verification tools and methods have to support the design of functional correct, robust, and safe systems. Especially, the automotive industry expects solutions that are in compliance with the ISO 26262 functional safety standard.

A simulation approach based on SystemC/SystemC AMS—SystemC is a set of C++ classes and macros providing an event-driven simulation interface while Analog Mixed Signal (AMS) is an extension of SystemC—is a possibility to validate the nominal behavior. It guarantees a high simulation speed while maintaining appropriate accuracy. Software development aspects can be included into the design and verification process. The approach also closes the bridge to Hardware-in-the-Loop (HiL) simulation and, therefore, to the lab validation.

So far little effort was spent in the improvement of the consideration of failure aspects and appropriate methods to model failure behavior.

SUMMARY

According to an embodiment, an apparatus for testing a circuit may have: an interrupter configured for interrupting based on a circuit model describing at least a part of the circuit a connection between two components of the circuit, wherein the circuit model is free of descriptions of faulty components and of descriptions of faulty signals and describes the entire circuit and the two components connected by the connection, an inserter configured for inserting based on the circuit model a test element model into the interrupted connection, and an evaluator configured for evaluating based on the circuit model and the test element model a response of the circuit model to the inserted test element model.

According to another embodiment, a method for testing a circuit may have the steps of: interrupting a circuit model being free of descriptions of faulty components and of descriptions of faulty signals and describing an entire circuit including a connection between two components, inserting a test element model into the interrupted connection, and evaluating a response of the circuit model to the inserted test element model.

The apparatus comprises at least an interrupter, an inserter, and an evaluator. The interrupter is configured for interrupting based on a circuit model describing at least a part of the circuit a connection between two components of the circuit. The connection is in one embodiment directly between the two components. In a different embodiment, the connection between the two components is via other components and/or additional connections. The circuit model describes the two components connected by the connection. The inserter is configured for inserting based on the circuit model a test element model into the interrupted connection. The evaluator is configured for evaluating based on the circuit model and the test element model a response of the circuit model to the inserted test element model.

The connection is interrupted and the test element model is inserted, both, with reference to the models of the circuit and of the test element and, thus, with regard to the mathematical/physical description. This implies that interrupting the connection provides a model of a circuit with an interrupted connection and that inserting the test element model provides a circuit model with an interrupted connection and an added test element. Eventually, this circuit model with an interrupted connection and an added test element is evaluated based on the models of the original, e.g. un-interrupted circuit and of the test element.

In an embodiment, the circuit model is configured to describe at least the two components of the circuit and to describe at least one characteristic of an ordinary signal being transmitted over the connection between the two components. The circuit model of this embodiment not only describes at least two components being connected to each other via a connection but also an ordinary signal. This ordinary or normal or undisturbed signal is usually passed over the connection between the components of the circuit in the faultless situation.

The apparatus performs a test of a circuit or so called Design Under Test (DUT) by using a circuit model that describes the circuit or at least a part of the circuit with at least two components of the circuit. The circuit model is a mathematical and/or physical description of the circuit and/or the at least two electronic components. In one embodiment, the circuit model comprises a netlist describing connections within the circuit.

For the actual test, a connection between the two components of the circuit is interrupted and a test element model is inserted into the interrupted connection. The test element model describes, for example, a signal or an additional electronic component. In one embodiment, the test element model is taken from a library containing different kinds of test element models for e.g. different signals or additional components.

Thus, for the test, the model of the circuit is modified by adding the model of at least one test element. This is either done automatically or due to a user input. The injection of a test element is followed by an evaluation of the response or the behavior of the circuit to the test element, accessed via their respective models.

In one embodiment, the testing is done using SystemC or SystemC AMS, which includes normal SystemC domains (1666.1-2016—IEEE Standard for Standard SystemC® Analog/Mixed-Signal Extensions). In this embodiment, the normal test bench includes an additional SystemC/SystemC AMS model which dynamically re-wires the DUT to include the failure, while also providing control handles for it. In SystemC AMS, there are different models of computation describing analog behavior, for example, conservative networks (for example: electrical networks) and/or non-conservative networks (data flow models). Reconnect and failure models exist for all these forms of description.

If the test element model is taken from a library, the invention can be described as a Dynamic Failure Injection Library Approach to be used to dynamically integrate failure structures into e.g. arbitrary SystemC or SystemC AMS descriptions of the circuit. The injection is realized in one embodiment at the beginning of the test case run by dynamically reconnecting netlists.

The invention allows injecting faulty behavior into descriptions of the nominal behavior by injection of the test element. An advantage is, that no change of the model or the netlists of the circuit (or device under test) itself is required. Thus, for a wide class of failures it is not necessary to modify the description for the nominal case or the circuits. Faulty behavior can be handled on the level of test scenarios.

The apparatus comprises in one embodiment a memory configured for storing the circuit model. In another embodiment, the memory stores additionally at least the test element model or a library of different test element models.

According to an embodiment, at least one of the two components of the circuit is an analog component. Analog components are, for example, resistances, capacitors, amplifiers, filters, rectifiers or mixers. In a different or alternative embodiment, at least one of the two components of the circuit is a digital component. Digital components are, for example, logic gates or microprocessors.

According to an embodiment, the circuit model is configured to describe the entire circuit. The circuit model, thus, describes the design of the components and their functions and/or connections within the circuit. In an embodiment, the circuit model also comprises a netlist of the entire circuit.

In a further embodiment, at least one characteristic of the ordinary signal described by the circuit model is a physical characteristic of the ordinary signal. Physical characteristics are, for instance, the amplitude and the phase of an electronic signal. The ordinary signal is transmitted between the two components in the usual or nominal situation.

In a further embodiment, the circuit model is configured to be free of descriptions of faulty components and of descriptions of faulty signals. According to this embodiment, the circuit model describes only the usual or nominal design and function of the circuit to be tested. It advantageously also contains the kind of reaction of the circuit or its components faced with an error being the deviation from the nominal situation. Nevertheless, the model does not contain any description of an error signal or of a faulty component and the like. It is free from any failure descriptions. Hence, the model just describes the functioning and error free circuit as such. The failure descriptions occur separately within the test environment by the test element models.

According to an embodiment, the test element model is configured to be a description in a way comparable to the description of the circuit model. In this embodiment, for the circuit model and the test element model the same kind or comparable kinds of description are used, so that the test element model can be inserted without further modifications into the interrupted connection of the circuit model.

In an alternative embodiment, the inserter is configured to insert the test element model using an adaptor into the interrupted connection. The adaptor adapts, in one embodiment, the test element model, so that the adapted test element model can be inserted into the interrupted connection of the circuit model. The adaptor, thus, matches the test element model with the circuit model. The adaptation also happens in the realm of the mathematical and physical description of circuits, their components and signals transmitted within circuits.

In a further embodiment, the test element model is configured to be describing at least one test signal. During an error it might happen, that a component provides an error signal that has to be detected by a following component. For testing this, a test signal overwrites in this embodiment the ordinary signal that is usually transmitted via the connection.

According to an embodiment, the test element model is configured to be describing at least an additional component. In this embodiment, an additional component (for example an analog or digital component) is inserted via its model between the two components. This embodiment allows to modify or to enlarge the circuit via its model under test conditions.

The object is also achieved by a method for testing a circuit. The circuit comprises at least the following steps: interrupting a circuit model describing at least a part of the circuit at a connection between two components, inserting a test element model into the interrupted connection, and evaluating a response of the circuit model to the inserted test element model.

The embodiments of the circuit can also be realized by the method, and vice versa.

In one embodiment of the method, the circuit model describes additionally to the two components at least one characteristic of an ordinary signal being transmitted over the connection between the two components of the circuit.

For the test, a circuit model for the circuit and at least one test element model for a test element are provided. The test element model is in one embodiment taken from a corresponding library of test element models.

In the specific test case, at least one connection within the circuit or DUT is—advantageously dynamically—separated. Into the separation a failure structure or failure structures are integrated via at least one test element model. This is done at the beginning of a test simulation, so that in the following the behavior of the circuit model is evaluated.

BRIEF DESCRIPTION OF THE DRAWINGS

Embodiments of the present invention will be detailed subsequently referring to the appended drawings, in which:

FIG. 1 shows an embodiment of an apparatus 1 for testing a circuit 2 as shown in FIG. 2.

DETAILED DESCRIPTION OF THE INVENTION

Figure 1:
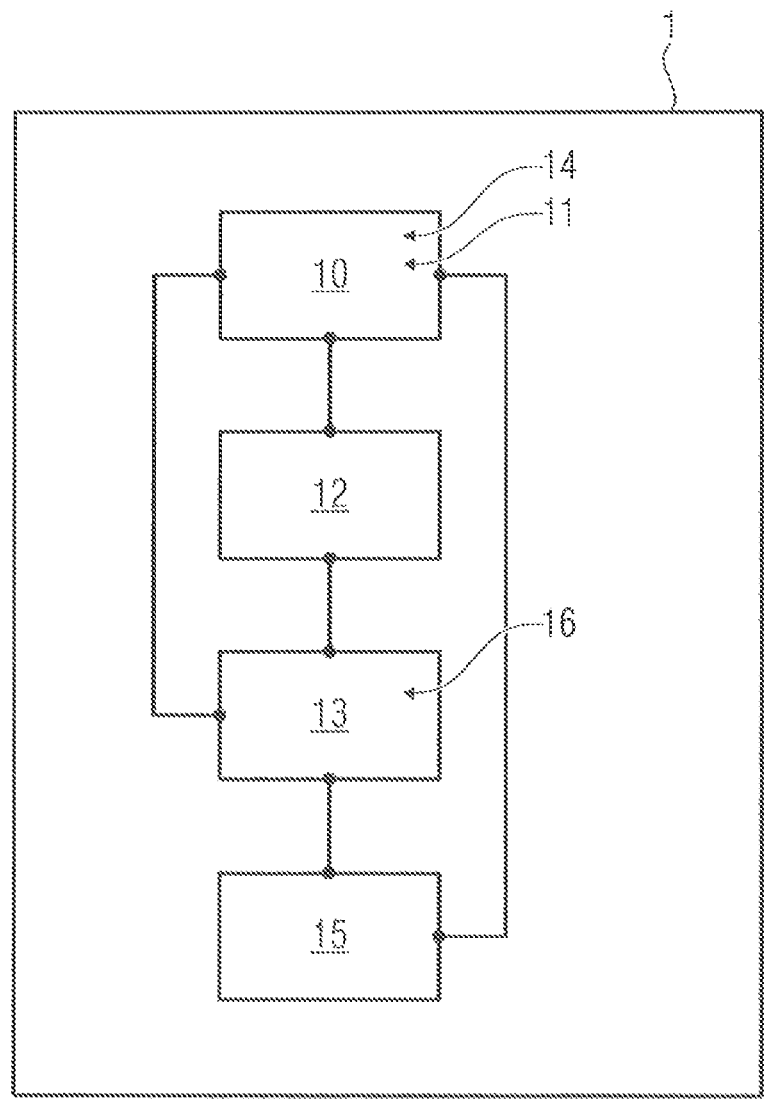
FIG. 1 shows a schematic embodiment of the apparatus.

The apparatus 1 comprises a memory 10 for storing a circuit model 11 and a test element model 14. The circuit model 11 describes the characteristics and the functions of the circuit 2 (or circuit under test). The test element model 14 is comparable to the circuit model 11 implying that the test element model 14 can be used together without further modifications with the circuit model 11. The circuit model 11 and the test element model 14, together, describe a modified circuit resulting from the given circuit 2, for example, by adding an error or fault signal or by adding an additional component.

An interrupter 12 interrupts an connection (22 in FIG. 2) of the circuit 2 in order to allow inserting e.g. an additional component or the substitution of an ordinary signal (23 in FIG. 2) by an error signal. The interruption happens in the circuit model 11 being the description of the real circuit.

In this interruption point of the connection 22, the inserter 13 inserts into the circuit model 11 the test element model 14. In other words: The description of the test element is added to the description of the circuit at the interruption point. For inserting the test element model 14, the inserter 13 uses an adaptor 16 in cases in which the test element model 14 is not directly applicable to the circuit model 11. The adaptor 16 in one embodiment allows to match the test element model 14 with the specific requirements of the circuit model 11. Hence, the adaptor 16 enables inserting the test element models 14 to a wider range of different circuits described by their circuit models 11.

The insertion of the test element model 14 is followed by the evaluator 15 which evaluates the resulting behavior of the circuit model 11 under the impact of the test element model 14.

The method for testing the circuit can, thus, be described as follows:
  A model of the circuit describing the circuit is provided. Further, at least one model of a test element is provided. The test element is, for example, an additional component or a test signal.
  A connection between two components of the circuit is interrupted within the circuit model, thus, providing a model of the circuit with an interrupted connection.
  Into the interrupted connection, the test element is inserted by injecting the test element model into the interrupted connection, thus, providing a model of the circuit with an inserted test element.
  The last mentioned model which comprises the model of the interrupted circuit and the model of the test element allows, finally, to evaluate the reaction of the circuit to the test element by considering the behavior of this eventually obtained model.

Figure 2:
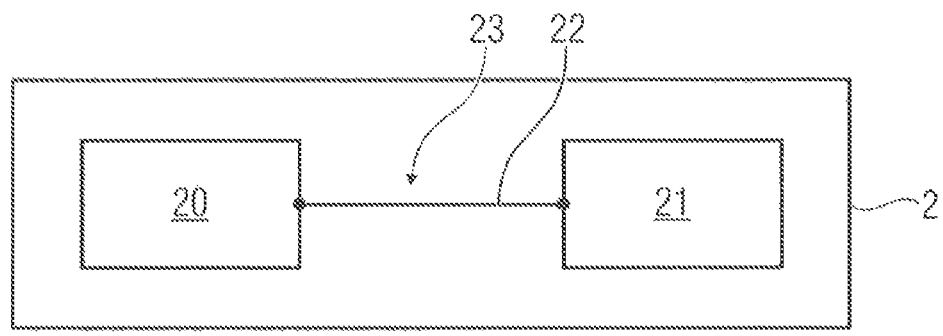
FIG. 2 illustrates a circuit to be tested by the apparatus.

FIG. 2 shows the circuit 2 before the test by depicting the components described by the circuit model 11. Two components 20, 21 are connected by a connection 22 via which the ordinary signal 23 is transmitted. The components 20, 21 are described by the circuit model 11. Further, the ordinary signal 23 is described by at least one of its physical parameters in the circuit model 11.

Figure 3:
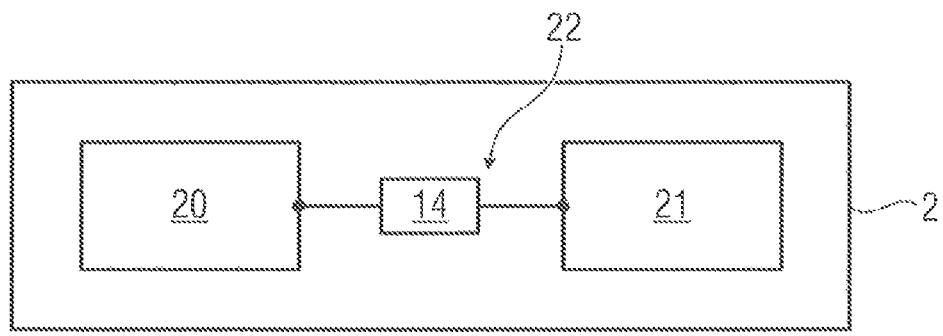
FIG. 3 illustrates the circuit shown in FIG. 2 with an added component.

FIG. 3 shows circuit 2 in case that in the connection 22 an additional component is inserted which is described by the test element model 14. The insertion of the additional component (e.g. an analog or digital component) is done only in the domain of the mathematical or physical descriptions of the circuit and the test element.

Figure 4:
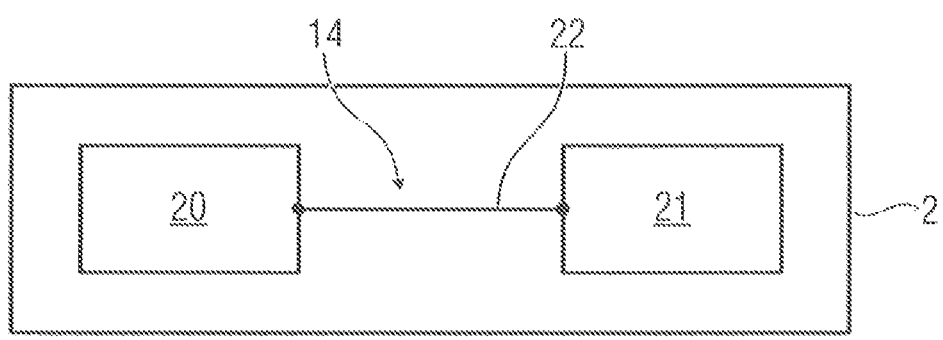
FIG. 4 illustrates the circuit shown in FIG. 2 with an inserted signal.

In FIG. 4, the test element is a test signal that is put via the test element model 14 into the connection 22 as a substitution for the ordinary signal 23.

In the shown example, the component 20 on the left usually sends signals within a given voltage range to the component 21 on the right. The test signal described by the test element model 14 may be a signal with a voltage outside of this range. In the test scenario, the component 21 on the right does not receive the ordinary signal but the test signal. As the voltage lies outside of the usual range, the receiving component 21 can be tested insofar as how the component 21 reacts to a—here—wrong voltage. In this embodiment, the interrupter (12 in FIG. 1) opens the connection 22 for inserting the test signal.

In one embodiment, the test element model 14 is taken from a library comprising different test element models 14 describing different test signals and/or different electronic components.

In order to enable usability for a wide range of different models/systems, a generic modelling approach is used providing the possibility for using the failure injection library for different model domains and models of computation (MoCs). The described failure injection approach offers the advantage of a clear and absolute separation between the functional model of the circuit or DUT and the test descriptions. This is achieved by a separation for both aspects related to data management and runtime integration. Additionally, this gives the possibility to develop completely separate descriptions of the functional model of circuits, the test environment and the failure description. Further, the invention allows to use predefined and unified interfaces.

The failure injection library as part of the invention uses a hierarchical approach. This means, the failure injection can be described at different abstraction levels. There are injection structures at the lowest level e.g., in order to disconnect signals/ports of a DUT netlist and failure inject models. This reconnection is dynamically done before the simulation of the related test case is started and without a change of the DUT model itself.

FIG. 5 shows low level failure structures for different domains. So called low-level structures are special models which need to be inserted after opening a connection in order to enable the possibility for integrating manipulated signal values. Due to different signal representations related to different MoCs, different low-level structures have to be provided.

For example, failure injection into electrical networks involves the integration of electrical structures build by using Kirchhoff models like resistors, capacitors, voltage sources and so on. In contrast, signal flow MoCs like TDF (Time Data Flow) or classical SC can be switched by using a multiplexor model.

Figure 5A:
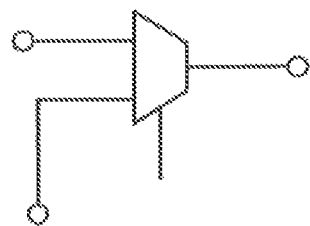
FIG. 5a-b show two different low level failure structures for different domains.

FIG. 5a) shows an example for sc/tdf connections: By reconnecting and integrating a multiplexor into a connection an alternating signal driving path can be used instead. This alternating path can include e.g. new signals/ports, combining old drivers with new ones or manipulate original signals by using mathematical functions.

Figure 5B:
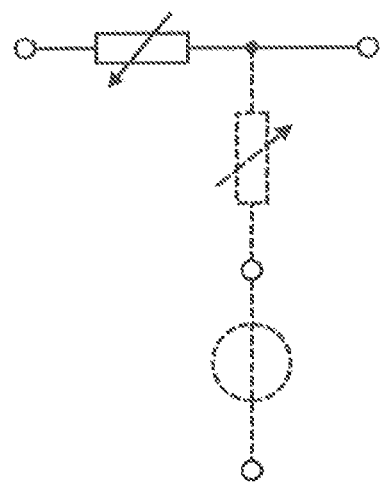

FIG. 5b) depicts an example for ELN (electric linear network) networks. The two components with broken lines are optional. The failure injection low level structure for electrical networks contains at least a switchable resistor on the one hand in order to open/short the original connection. On the other hand a possible damping of the original connection can be defined.

An optional switchable resistor enables the injection of additional signal drivers, e.g. in order to enable fault models like crosstalk. An optional serial voltage source can be used to perform stuck-at value fault models.

At the next hierarchical level, a number one abstraction level higher classical failure models like stuck-at, crosstalk, open/short etc. exist and are configurable. During the instantiation of one of these models, the domain/MoC of the target signal/port is recognized automatically and the correct low level injection structure is chosen and used.

At the highest abstraction level, there are some predefined failure scenarios and also a template scenario, which can be integrated to create and configure own failure scenarios.

For highlighting the use of the proposed invention during lab validation, the different prototypes are introduced to show the advantages of the HiL (Hardware-in-the-Loop) approach along with the introduced failure injection library. There are three major groups of prototypes:

Pure Virtual: a virtual prototype completely modeled and executed by a simulator.

Real Hardware: a setup where every part of the prototype is represented by an existing piece of hardware.

Mixed (HiL): a mix of both, thereby the virtual part is executed on special HiL hardware.

To compare them they are evaluated regarding different aspects:

Debug: Accessibility and traceability of signals for error root cause analysis.

Speed/Detail: Tradeoff between model speed vs detail level.

Failure Injection: Possibility to manipulate expected behavior to evaluate system robustness.

The results are:

|  | Pure Virtual | Real Hardware | Mixed (Hil) |
|---|---|---|---|
| Debug | ++ | -- | + |
| Environment model | + | + | ++ |
|  | Virtual Sensors | Hardware Sensors | Both possible |
| Speed/Detail | -- | ++ | + |
| Failure Injection | ++ | -- | + |

The table shows that virtual prototypes are most easy to debug and have a tradeoff between the level of detail vs their simulation speed. The hardware prototypes maintain by nature every piece of detail and maintain full speed, but have a very limited accessibility to the signals (debug aspect). Especially, when it comes to failure injection the virtual prototype is superior to the hardware and can use the failure injection library according to the invention. Combining the advantages of both prototypes in a HiL system contains hardware parts where needed, for example, to realistically run firmware on a control unit, while maintaining the complex environment with the ability to inject faults as a model connected to it.

Some points of the invention according to different embodiments are:

Using the nominal description for a simulation task for the purposes of simulating faulty behavior without changing the description for the nominal behavior.

Separate description of the failure scenario.

Injection of failures at different times of the simulation at different locations in the circuit.

Method to manipulate the original netlist without user intervention for the purposes of the failure simulation.

Providing a set of functions for creating a base library for modifying netlist descriptions (base models).

Procedure for creating complex failure models based on the base models (hierarchical failure library).

The method may be used for the simulation using SystemC/SystemC AMS based simulations. It may also be applied to different modeling approaches that allow the implementation of the base functions described.

The invention is applicable to digital and analog components (and specifically related to SystemC AMS on the different models of computation (MoC)) by using the appropriate descriptions of the test elements. The advantage is, that the invention is also applicable to analog components/signals and there are models that render the approach to the different MoCs in the SystemC AMS applicable.

The invention is in one embodiment applied to transaction level models (TLM—DIGITAL modeling methodology with a higher level of abstraction), wherein signals as such no longer exist. Hence, the discussed Reconnect approach (dynamic separation of connections and insertion of failure structures at the time of elaboration) is expanded by using so-called adaptors.

In addition to a failure injection, the invention is in one embodiment used to dynamically integrate any other components into the model description of the circuit. For example, special stimuli are integrated to ensure special tests (for example, sweeping the input voltages using an ADC value range rather than a battery cell located in the system). The advantage is: The dynamic Reconnect approach may be applied to other areas besides the failure injection, for example, bypassing model parts of the DUT and instead integrating stimuli sources, models, that realize a signal distortion or others instead.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for testing a circuit, comprising:
   an interrupter configured for interrupting based on a circuit model describing at least a part of the circuit a connection between two components of the circuit,
   wherein the circuit model is free of descriptions of faulty components and of descriptions of faulty signals and describes the entire circuit and the two components connected by the connection,
   an inserter configured for inserting based on the circuit model a test element model into the interrupted connection, and
   an evaluator configured for evaluating based on the circuit model and the test element model a response of the circuit model to the inserted test element model.

2. The apparatus of claim 1,
   wherein the circuit model is configured to describe at least the two components of the circuit and to describe at least one characteristic of an ordinary signal being transmitted over the connection between the two components.

3. The apparatus of claim 2,
   wherein the characteristic of the ordinary signal is a physical characteristic of the ordinary signal.

4. The apparatus of claim 1,
   wherein at least one of the two components of the circuit is an analog component.

5. The apparatus of claim 1,
   wherein at least one of the two components of the circuit is a digital component.

6. The apparatus of claim 1,
   wherein the test element model is configured to be a description comparable to the description of the circuit model.

7. The apparatus of claim 1,
   wherein the test element model is configured to be describing at least a test signal.

8. The apparatus of claim 1,
   wherein the test element model is configured to be describing at least an additional component.

9. The apparatus of claim 1,
   wherein the inserter is configured to insert the test element model using an adaptor into the interrupted connection.

10. The apparatus of claim 1,
    wherein the apparatus comprises a memory configured for storing the circuit model.

11. The apparatus of claim 10,
    wherein the memory is configured to store the test element model.

12. A method for testing a circuit,
comprising:
   interrupting a circuit model being free of descriptions of faulty components and of descriptions of faulty signals and describing an entire circuit comprising a connection between two components,
   inserting a test element model into the interrupted connection, and
   evaluating a response of the circuit model to the inserted test element model.

* * * * *